(12) United States Patent
Oshimi et al.

(10) Patent No.: US 7,968,672 B2
(45) Date of Patent: Jun. 28, 2011

(54) PHENOLIC RESIN, PROCESS FOR PRODUCTION THEREOF, EPOXY RESIN, AND USE THEREOF

(75) Inventors: Katsuhiko Oshimi, Tokyo (JP); Shigeru Moteki, Tokyo (JP); Takao Sunaga, Tokyo (JP); Masataka Nakanishi, Tokyo (JP); Sumio Ichimura, Tokyo (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 572 days.

(21) Appl. No.: 12/085,287

(22) PCT Filed: Nov. 29, 2006

(86) PCT No.: PCT/JP2006/323808
§ 371 (c)(1),
(2), (4) Date: May 20, 2008

(87) PCT Pub. No.: WO2007/063894
PCT Pub. Date: Jun. 7, 2007

(65) Prior Publication Data
US 2009/0286929 A1 Nov. 19, 2009

(30) Foreign Application Priority Data
Nov. 30, 2005 (JP) ................................. 2005-345259

(51) Int. Cl.
*C08G 65/38* (2006.01)
*C08G 59/00* (2006.01)
(52) U.S. Cl. .......................................... 528/214; 528/98
(58) Field of Classification Search ...................... 528/98
See application file for complete search history.

(56) References Cited

U.S. PATENT DOCUMENTS

| 5,382,710 | A | * | 1/1995 | Walters et al. ................. 568/720 |
| 5,412,057 | A | * | 5/1995 | Hefner et al. ..................... 528/96 |
| 5,612,442 | A | | 3/1997 | Okazaki et al. ............... 528/212 |
| 6,361,866 | B1 | | 3/2002 | Ogima et al. ................. 428/413 |
| 6,723,452 | B2 | | 4/2004 | Kimura et al. ................ 428/620 |
| 2003/0009001 | A1 | * | 1/2003 | Akatsuka et al. ............... 528/86 |
| 2004/0166326 | A1 | * | 8/2004 | Akatsuka et al. ............. 428/413 |
| 2006/0058473 | A1 | | 3/2006 | Kawada et al. ............... 525/524 |
| 2008/0200636 | A1 | * | 8/2008 | Nakanishi et al. ............ 528/105 |
| 2009/0054587 | A1 | * | 2/2009 | Oshimi et al. ................ 524/612 |

FOREIGN PATENT DOCUMENTS

| EP | 1 710 626 | 1/2005 |
| JP | 63-238129 | 10/1988 |
| JP | 5-1157 | 1/1993 |
| JP | 5-117350 | 5/1993 |
| JP | 8-143648 | 6/1996 |
| JP | 9-268219 | 10/1997 |
| JP | 11-5832 | 1/1999 |
| JP | 11-255868 | 9/1999 |
| JP | 2001-89550 | 4/2001 |
| JP | 2001-329051 | 11/2001 |
| JP | 2002-241475 | 8/2002 |
| JP | 2002-309085 | 10/2002 |
| JP | 2002-322110 | 11/2002 |
| JP | 2002-338656 | 11/2002 |
| JP | 2003-55437 | 2/2003 |
| JP | 2003-64164 | 3/2003 |
| JP | 2004-59777 | 2/2004 |

(Continued)

OTHER PUBLICATIONS

OA dated Nov. 3, 2009 in co-pending U.S. Appl. No. 11/908,526.
The International Search Report dated Apr. 25, 2006 in co-pending U.S. Appl. No. 11/908,526, (PCT/JP2006/305041).
Int. Search Report dated Apr. 18, 2006 in co-pending U.S. Appl. No. 11/884,174, (PCT/JP2006/302947).
Chinese communication dated Nov. 6, 2009, with English translation.

(Continued)

*Primary Examiner* — Mark Eashoo
*Assistant Examiner* — Megan McCulley
(74) *Attorney, Agent, or Firm* — Nields, Lemack & Frame, LLC

(57) ABSTRACT

A phenol aralkyl type phenolic resin represented by the general formula (1), wherein the total content of the compounds represented by formulae (2) to (4) is 58 to 92% as determined by GPC and the contents of the compounds represented by formulae (2) to (4) as determined by HPLC satisfy the following relationship: $0.60 \leq (2a+b)/(2a+2b+2c) \leq 0.90$ wherein a is the content of the compound of formula (2); b is the content of the compound of formula (3); and c is the content of the compound of formula (4).

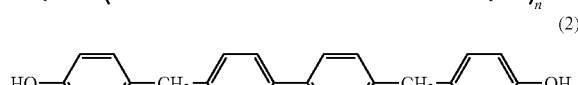

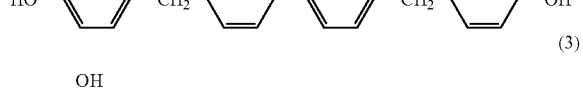

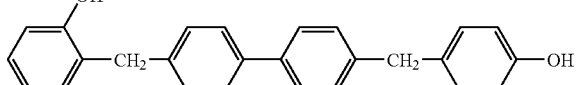

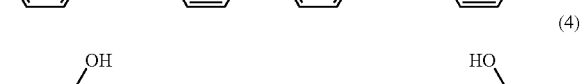

13 Claims, No Drawings

FOREIGN PATENT DOCUMENTS

| | | |
|---|---|---|
| JP | 2004-99837 | 4/2004 |
| JP | 2005-239743 | 9/2005 |
| JP | 2005-314525 | 11/2005 |
| JP | 2006-002139 | 1/2006 |
| JP | 2006-63207 | 3/2006 |

OTHER PUBLICATIONS

OA dated Nov. 19, 2009 in co-pending U.S. Appl. No. 11/884,174.
The International Search Report dated Dec. 26, 2006.

* cited by examiner

PHENOLIC RESIN, PROCESS FOR PRODUCTION THEREOF, EPOXY RESIN, AND USE THEREOF

TECHNICAL FIELD

The present invention relates to a phenolic resin useful as a raw material for a crystalline epoxy resin having a low melt viscosity, a crystalline epoxy resin, an epoxy resin composition containing the epoxy resin, and a cured product obtained from the epoxy resin composition.

BACKGROUND ART

Epoxy resins are cured with various curing agents to yield cured products generally excellent in properties such as mechanical properties, water resistance, chemical resistance, heat resistance and electrical properties, and are used in wide fields associated with materials such as adhesives, coating compositions, laminates, molding materials and casting materials. In applications as materials such as semiconductor sealants, heat resistance is required and accordingly cresol novolac epoxy resins are widely used. As surface mounting has prevailed, frequently semiconductor packages are directly exposed to high temperatures during reflow soldering, and additionally, as consciousness in environmental issues has recently been raised, lead-free solders have been used in semiconductor mounting in increasing cases. Such lead-free solders are higher in melting temperature by about 20° C. (melted at about 260° C.) than conventional solders, and consequently provide far higher possibilities of package crack occurrence during reflow soldering than conventional semiconductor sealants. With such circumstances as background, a biphenyl novolac epoxy resin has been proposed as an epoxy resin having excellent performances in such properties as heat resistance, moisture resistance and shock resistance (see Patent Document 1). Additionally, as a technique to decrease the melt viscosity of such a biphenyl skeleton-containing epoxy resin, a crystalline epoxy resin having a higher concentration of a bifunctional component has been proposed (see Patent Document 2). It is to be noted that a proposal has already been made on a biphenyl skeleton-containing phenolic compound to be a useful raw material for the crystalline epoxy resin (see Patent Document 3).

Patent Document 1: JP-A-5-117350 (pp. 1 to 6)
Patent Document 2: JP-A-2002-338656 (pp. 1 to 5)
Patent Document 3: JP-A-2002-322110 (pp. 1 to 3)

DISCLOSURE OF THE INVENTION

A novolac epoxy resin having such a molecular weight distribution as described in a working example of Patent Document 1 is relatively high in melt viscosity and hence a high filler filling therein has encountered some limits. For the purpose of producing the crystalline epoxy resin described in Patent Document 2, as described in Patent Document 3, it is necessary to use a crystalline phenolic resin obtained through a recrystallization step from a resinous phenolic resin, and hence it is difficult to industrially inexpensively produce the crystalline epoxy resin described in Patent Document 2. A main object of the present invention is to provide a biphenyl skeleton-containing crystalline epoxy resin which can be produced without involving a recrystallization step and leads to an epoxy resin composition exhibiting an excellent fluidity.

The present inventors have continued a diligent study for the purpose of solving the above-described problems, and has consequently completed the present invention.

Specifically, the constitution of the present invention is as follows.

[1] A phenolic resin which is a phenol aralkyl phenolic resin represented by formula (1), wherein a total content of the compounds respectively represented by formulas (2) to (4) as measured by GPC analysis is 58 to 92%, and the component ratio between the compounds respectively represented by formulas (2) to (4) as measured by HPLC analysis is represented by the following relation:

$$0.60 \leq (2a+b)/(2a+2b+2c) \leq 0.90$$

wherein
a; the content proportion of the compound of formula (2)
b; the content proportion of the compound of formula (3)
c; the content proportion of the compound of formula (4)

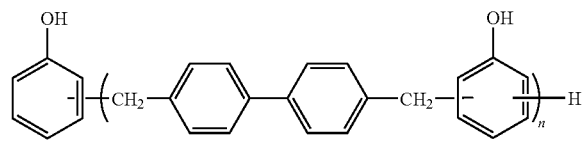

(In formula (1), n denotes a repetition number and represents a positive number of 1 to 10.)

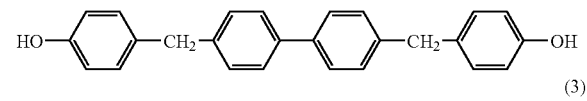

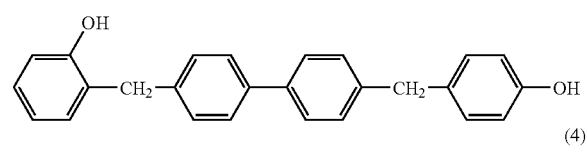

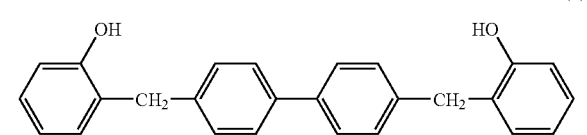

[2] A process for producing the phenolic resin according to the above paragraph [1], wherein a biphenyl compound represented by formula (5) and phenol are subjected to a reaction in the presence of a strongly acidic substance.

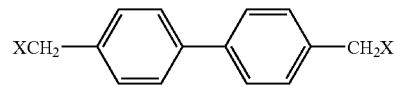

(In formula (5), X represents a chlorine atom, a bromine atom, a methoxy group, an ethoxy group or a hydroxy group.)

[3] The process for producing the phenolic resin according to the above paragraph [2], wherein the strongly acidic substance is hydrogen bromide.

[4] A crystalline epoxy resin which is obtained by subjecting the phenolic resin according to the above paragraph [1] and epihalohydrin to a reaction in the presence of an alkali metal hydroxide.

[5] An epoxy resin which is a phenol aralkyl epoxy resin represented by formula (6), wherein a total number of moles (p-coordination number) of the benzene rings in each of which a methylene group is bonded at a p-position in relation to a glycidyl ether group and a total number of moles (o-coordination number) of the benzene rings in each of which a methylene group is bonded at an o-position in relation to a glycidyl ether group satisfy the relation, 0.57≦p-coordination number/(p-coordination number+o-coordination number)≦0.90, and a total content of the compounds represented by formula (7) as measured by GPC analysis is 53 to 92%.

(6)

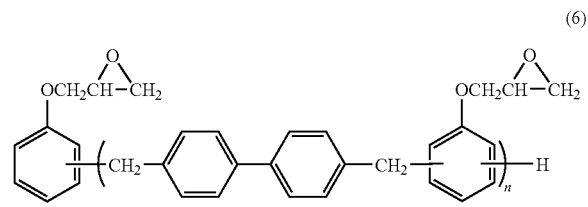

(In formula (6), n denotes a repetition number and represents a positive number of 1 to 10.)

(7)

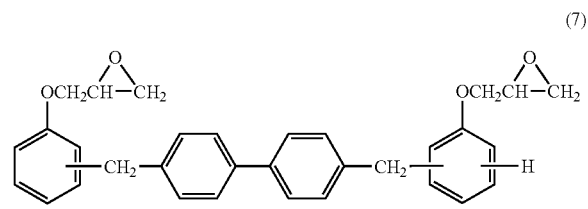

[6] An epoxy resin composition, including the epoxy resin according to the above paragraph [4] or [5] and a curing agent.

[7] The epoxy resin composition according to the above paragraph [6] including a curing accelerator.

[8] The epoxy resin composition according to the above paragraph [6] or [7] including an inorganic filler.

[9] A cured product obtainable by curing the epoxy resin composition according to any one of the above paragraphs [6] to [8].

The epoxy resin of the present invention provides a cured product excellent in balance between the properties such as heat resistance, moisture resistance and fluidity, as compared to epoxy resins which have hitherto been proposed. Accordingly, the epoxy resin composition of the present invention is extremely useful in a wide range of applications associated with materials such as electric and electronic materials, molding materials, casting materials, laminate materials, coating compositions, adhesives, resists and optical materials.

BEST MODE FOR CARRYING OUT THE INVENTION

The phenolic resin of the present invention is obtained by condensation reacting phenol with a biphenyl compound represented by formula (5) in the presence of a strongly acidic substance, and by thereafter removing unreacted phenol and impurities under heating.

(5)

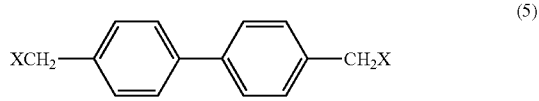

(In formula (5), X represents a chlorine atom, a bromine atom, a methoxy group, an ethoxy group or a hydroxy group.)

As for the epoxy resin of the present invention, the raw materials and the process for production thereof are not particularly limited as described below as long as the p-orientation ratio and the content of the bifunctional components fall within the below specified ranges; however, it is preferable to glycidyl-etherify the phenolic resin of the present invention. By making the p-orientation ratio and the content of the bifunctional components in an epoxy resin fall within the below specified ranges, a crystalline epoxy resin can be obtained without operation of increasing the content of the bifunctional components up to nearly 100% as described in Patent Document 2.

The process for production of a phenolic resin of the present invention is characterized in that a strongly acidic substance is used as an acid catalyst. The phenolic resin obtained by the above-described condensation reaction which uses a strongly acidic substance has been verified to have a high p-orientation. In general, a diglycidyl ether epoxy resin has a tendency to exhibit a high crystallinity when the glycidyl ether groups are located at mutual p-positions as in bisphenol A epoxy resin, bis(4-hydroxyphenyl)methane epoxy resin and 4,4'-biphenol epoxy resin, that is, the molecular symmetry is high. Also, as for the epoxy resin of the present invention, the glycidyl-etherified epoxy resin of the present invention has crystallinity because the p-orientation of the phenolic resin used as a raw material is relatively high.

In the above-described condensation reaction, the feed ratios of the raw materials are such that the amount of phenol is usually 3 to 40 moles and preferably 5 to 30 moles in relation to 1 mole of the compound of formula (5).

Examples of the compound of formula (5) include 4,4'-bis(chloromethyl)-1,1'-biphenyl, 4,4'-bis(bromomethyl)-1,1'-biphenyl, 4,4'-bis(methoxymethyl)-1,1'-biphenyl and 4,4'-bis(ethoxymethyl)-1,1'-biphenyl.

Various compounds can be used as the strongly acidic substance; examples of such compounds include organic and inorganic acids such as hydrogen bromide, sulfuric acid, methanesulfonic acid and trifluoromethanesulfonic acid. Preferable as the strongly acidic substance are acids higher in acid strength than hydrochloric acid, and preferable among such acids is hydrogen bromide. The amounts of these acid catalysts are different depending on the types of the catalysts; the acid catalysts may be added each in an amount to fall within a range from 0.005 to 5 in terms of the molar ratio in relation to the compound of formula (5). It may be noted that when hydrogen bromide is selected as the strongly acidic substance, an aqueous solution of hydrogen bromide (hydrobromic acid) is preferably used.

The condensation reaction can be conducted either in the absence or in the presence of a solvent. When a solvent is used, examples of the usable solvent include methanol, ethanol, isopropanol, methyl ethyl ketone, methyl isobutyl ketone, toluene and xylene. The amount of a solvent is usually 5 to 300% by weight and preferably 10 to 200% by weight in relation to the total weight of phenol and the compound represented by formula (5). The condensation reaction temperature is usually 0 to 120° C. and the reaction time is usually 1 to 10 hours.

After the completion of the condensation reaction, the acid catalyst is removed by neutralization and washing with water, and then the used solvent and the unreacted phenol are removed according to need under heating and reduced pressure. Purification such as recrystallization can also be carried out at this stage, but is not necessary; implementation of such a purification step is disadvantageous from the viewpoint of cost. Examples of the solvents usable for recrystallization include, but not limited to, toluene, methyl ethyl ketone, acetone, methyl isobutyl ketone, n-hexane, methanol and ethanol; these solvents may also be used as mixtures thereof. In the recrystallization, one of these single and mixed solvents is heated and the reaction mixture is dissolved in the heated solvent, and thereafter cooled and filtered. When the purity of the product is increased by repeating recrystallization, the value of $(2a+b)/(2a+2b+2c)$ is increased.

In the thus obtained phenolic resin of the present invention, as described above, the total content (hereinafter referred to as "the content of the bifunctional components") of the compounds respectively represented by formulas (2) to (4) as measured by GPC (gel permeation chromatography) is 58 to 92%, and the component ratio (hereinafter referred to as "the p-orientation ratio of the bifunctional components") between the compounds respectively represented by formulas (2) to (4) as measured by HPLC (high performance liquid chromatography) satisfies the following relation:

$$0.60 \leq (2a+b)/(2a+2b+2c) \leq 0.90$$

wherein
  a; the content proportion of the compound of formula (2)
  b; the content proportion of the compound of formula (3)
  c; the content proportion of the compound of formula (4)
The phenolic resin of the present invention becomes higher in p-orientation than the conventional phenolic resins obtained by reacting p-toluenesulfonic acid in the presence or absence of an acid catalyst. Accordingly, the crystallinity of the glycidyl-etherified epoxy resin is also improved. It may be noted that when the amount of phenol is small, the content of the bifunctional components tends to be decreased.

By glycidyl-etherifying the thus obtained phenolic resin of the present invention in epihalohydrin ($C_3H_5XO$: X is F, Cl, Br or I) in the presence of an alkali metal hydroxide, the epoxy resin of the present invention represented by formula (6) can be obtained. In the reaction for obtaining the epoxy resin of the present invention, the alkali metal hydroxide may be used as an aqueous solution thereof. In such a case, a method may be adopted in which the aqueous solution of the alkali metal hydroxide is continuously added in the reaction system, and water and epihalohydrin are continuously distilled off under reduced pressure or normal pressure, and further, water is removed from the distillate and epihalohydrin is continuously returned to the reaction system.

(6)

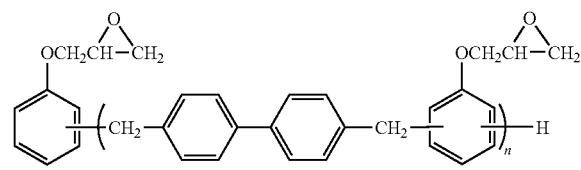

(In formula (6), n denotes a repetition number and represents a positive number of 1 to 10.)

Additionally, another method may be adopted in which to a mixture composed of the phenolic resin of the present invention and epihalohydrin, a quaternary ammonium salt such as tetramethylammonium chloride, tetramethylammonium bromide or trimethylbenzylammonium chloride is added as a catalyst, the mixture is allowed to react at 50 to 150° C. for 0.5 to 8 hours to yield a halohydrin-etherified product of the phenolic resin, an alkali metal hydroxide is added as solid or as an aqueous solution thereto and is allowed to react at 20 to 120° C. for 1 to 10 hours to carry out dehydrohalogenation (ring closure).

Usually, the amount of epihalohydrin used in these reactions is 0.8 to 12 moles and preferably 0.9 to 11 moles in relation to 1 mole of the hydroxy group of the phenolic resin of the present invention. In this case, in order to smoothly progress the reaction, it is preferable to conduct the reaction under the addition of an alcohol such as methanol or ethanol, or an aprotic polar solvent such as dimethyl sulfone or dimethyl sulfoxide.

When an alcohol is used, the amount thereof is usually 2 to 20% by weight, and preferably 4 to 15% by weight in relation to the amount of epihalohydrin. Alternatively, when an aprotic polar solvent is used, the amount thereof is usually 5 to 150% by weight and preferably 10 to 140% by weight in relation to the amount of epihalohydrin.

From the reaction product in each of these epoxidation reactions, epihalohydrin, the solvent and the like are removed under heating and reduced pressure after washing with water or without washing with water the reaction product. Additionally, for the purpose of preparing the epoxy resin small in the amount of hydrolyzable halogen, the recovered epoxy resin is dissolved in a solvent such as toluene or methyl isobutyl ketone, the solution is added with an aqueous solution of an alkali metal hydroxide such as sodium hydroxide or potassium hydroxide and is allowed to react, and thus the ring closure can be ensured. In this case, the amount of the alkali metal hydroxide is usually 0.01 to 0.3 mole and preferably 0.05 to 0.2 mole in relation to 1 mole of the hydroxy group in the phenolic resin of the present invention used in the epoxidization; the reaction temperature is usually 50 to 120° C. and the reaction time is usually 0.5 to 2 hours.

After completion of the reaction, the produced salt is removed by filtering or washing with water, and further the solvent is distilled off under heating and reduced pressure to yield the epoxy resin of the present invention.

In the thus obtained epoxy resin of the present invention, as described above, the relation (hereinafter referred to as the p-orientation ratio) between the total number of moles (p-coordination number) of the benzene rings in each of which a methylene group is bonded at a p-position in relation to a glycidyl ether group and the total number of moles (o-coordination number) of the benzene rings in each of which a methylene group is bonded at an o-position in relation to a glycidyl ether group satisfies the relation, $0.57 \leq$ p-coordination number/(p-coordination number+o-coordination number) $\leq 0.90$ (as measured by $^{13}$C-NMR), and the total content (hereinafter referred to as the content of the bifunctional components) of the compounds represented by formula (7) as measured by GPC is 53 to 92%.

(7)

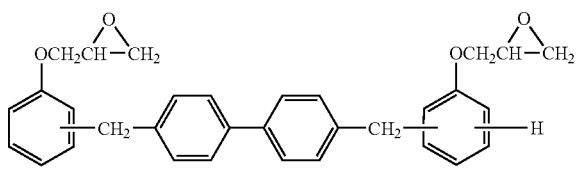

The conditions that the p-orientation ratio is high and the content of the bifunctional components is large are effective for the improvement of the crystallinity of the glycidyl-etherified epoxy resin. A glycidyl-etherified epoxy resin falling outside the two above-described conditions does not produce crystals when cooled down to room temperature after distilling off the solvent under heating and reduced pressure, and accordingly the resin becomes semi-solidified to unpreferably cause difficulty in handling.

Alternatively, another glycidyl-etherified epoxy resin falling outside the two above-described conditions is too high in the crystallinity thereof, and accordingly crystals separate out in the course of the production of the epoxy resin to unpreferably cause the decrease of the yield.

It may be noted that, according to need, the obtained epoxy resin may be subjected to a treatment to accelerate crystallization or a recrystallization treatment. Examples of the treatment to accelerate crystallization include a technique to apply shear to the resin and a technique using seed crystals. Additionally, as for the recrystallization treatment, examples of the solvents usable in the recrystallization include, but not limited to, toluene, methyl ethyl ketone, acetone, methyl isobutyl ketone, n-hexane, methanol and ethanol; these various solvents may also be used as mixtures thereof. In the recrystallization, without causing any trouble, a usual method may be adopted in which one of these single and mixed solvents is heated and the reaction mixture is dissolved in the heated solvent, and thereafter cooled and filtered.

Hereinafter, the epoxy resin composition of the present invention is described. The epoxy resin of the present invention can be used alone or in combination with other epoxy resins. When used in combination, the proportion of the epoxy resin of the present invention in the total amount of the epoxy resins is preferably 30% by weight or more and particularly preferably 40% by weight or more.

Specific examples of the other epoxy resins usable in combination with the epoxy resin of the present invention include orthocresol novolac epoxy resin, dicyclopentadiene-modified phenol epoxy resin, trisphenolmethane epoxy resin, naphthol epoxy resin, phenol aralkyl epoxy resin, naphthol aralkyl resin, biphenyl epoxy resin, stilbene epoxy resin, hydroquinone epoxy resin, bisphenol epoxy resin, and other generally heretofore known epoxy resins. These resins may be used each alone or in combinations of two or more thereof.

The epoxy resin composition of the present invention includes a curing agent. Examples of the usable curing agent include, but not limited to, phenol compounds, and additionally, amine compounds, acid anhydride compounds and amido compounds. Specific examples of the usable curing agent include, but not limited to, phenol novolac resin, cresol novolac resin, terpene-modified phenolic resin, dicyclopentadiene-modified phenolic resin, triphenolmethane resin, phenol aralkyl resin containing a phenylene skeleton or a biphenylene skeleton, naphthol aralkyl resin, the phenolic resin of the present invention, diaminodiphenylmethane, diethylenetriamine, triethylenetetramine, diaminodiphenyl sulfone, isophorone diamine, dicyanediamide, polyamide resin synthesized from linolenic acid dimer and ethylenediamine, phthalic anhydride, trimellitic anhydride, pyromellitic anhydride, maleic anhydride, tetrahydrophthalic anhydride, methyltetrahydrophthalic anhydride, methylnadic anhydride, hexahydrophthalic anhydride, methylhexahydrophthalic anhydride, phenol novolac, and modified products of these compounds, imidazole, $BF_3$-amine complexes and guanidine derivatives. These curing agents may be used each alone or in combinations of two or more thereof.

In the epoxy resin composition of the present invention, the amount of the curing agent is preferably 0.7 to 1.2 equivalents in relation to one equivalent of the epoxy group of the epoxy resin. Either when the amount is less than 0.7 equivalent or when larger than 1.2 equivalents in relation to one equivalent of the epoxy group, curing may proceed to an insufficient extent to yield no satisfactory curing physical properties.

Additionally, in the epoxy resin composition of the present invention, a curing accelerator may be used in combination without causing any trouble. Specific examples of the usable curing accelerator include: imidazoles such as 2-methylimidazole, 2-ethylimidazole and 2-ethyl-4-methylimidazole; tertiary amines such as 2-(dimethylaminomethyl)phenol and 1,8-diaza-bicyclo(5,4,0)undecene-7; phosphines such as triphenylphosphine; and metal compounds such as tin octylate. The curing accelerator is used, according to need, in an amount of 0.1 to 5.0 parts by weight in relation to 100 parts by weight of the epoxy resin.

The epoxy resin composition of the present invention may include, according to need, an inorganic filler. Specific examples of the usable inorganic filler include silica, alumina and talc. The inorganic filler may be used in an amount to account for 0 to 90% by weight of the epoxy resin composition of the present invention. Further, the epoxy resin composition of the present invention may be added with: release agents such as a silane coupling agent, stearic acid, palmitic acid, zinc stearate and calcium stearate; and various additives such as a pigment.

The epoxy resin composition of the present invention may include, according to need, a thermosetting resin or a thermoplastic resin other than epoxy resin. Specific examples of such resins include vinyl ester resin, unsaturated polyester resin, maleimide resin, polycyanate resin, isocyanate compounds, benzooxazine compounds, vinyl benzyl ether compounds, polybutadiene and modified resins thereof, modified resins of acrylonitrile copolymer, indene resin, fluorine resin, silicone resin, polyether imide, polyether sulfone, polyphenylene ether, polyacetal, polystyrene, polyethylene and dicyclopentadiene resin. The thermosetting resin or the thermoplastic resin is used in the epoxy resin composition of the present invention in an amount to account for 0 to 90% by weight of the epoxy resin composition.

The epoxy resin composition of the present invention is obtained by uniformly mixing the above-described individual components. The epoxy resin composition of the present invention can be easily transformed into a cured product thereof by means of the same methods as heretofore known methods. For example, epoxy resin, a curing agent, and according to need, a curing accelerator, an inorganic filler and additives are mixed to a sufficient extent by using, according to need, apparatuses such as an extruder, a kneader and a roll until a uniform mixture is obtained to yield an epoxy resin composition. The epoxy resin composition thus obtained is melted, thereafter molded by using a cast molding or transfer molding machine, and further heated at 80 to 200° C. for 2 to 10 hours to yield a cured product.

Alternatively, a cured product can also be obtained by subjecting a prepreg obtained as described below to heat press molding: the epoxy resin composition of the present invention is dissolved in a solvent such as toluene, xylene, acetone, methyl ethyl ketone and methyl isobutyl ketone, impregnated into a base material such as glass fiber, carbon fiber, polyester fiber, polyamide fiber, alumina fiber or paper, and semidried by heating to yield the prepreg. The solvent used in this case accounts for usually 10 to 70% by weight and preferably 15 to 70% by weight in the mixture composed of the epoxy resin composition of the present invention and the solvent.

EXAMPLES

Hereinafter, the present invention is described more specifically on the basis of Examples. Parts mean parts by weight unless otherwise specified. The softening point, the content of the bifunctional components, the p-orientation ratio of the bifunctional components, the epoxy equivalent, the melt viscosity and the p-orientation ratio were measured under the following conditions.

(1) Softening Point

The softening point was measured according to a method described in JIS K-7234.

(2) Content of the Bifunctional Components

The content of the bifunctional components was obtained by GPC measurement.

(Specifications)

Column: GPC KF-803+GPC KF-802.5+GPC KF-802+ GPC KF-801 (manufactured by Showa Denko Co., Ltd.)

Column temperature: 40° C.

Eluent: Tetrahydrofuran

Flow rate: 1 ml/min

Detection: RI (3) p-Orientation Ratio of the Bifunctional Components

The p-orientation ratio of the bifunctional components was obtained by HPLC measurement.

(Specifications)

Column: Inertsil ODS-2 (4.6 mm×150 mm) (manufactured by GL Sciences Inc.)

Column temperature: 40° C.

Eluent: Water/acetonitrile

Gradient: 30% (acetonitrile)→100% (28 min/gradient)

Flow rate: 1 ml/min

Detection: UV (274 nm)

(4) Epoxy Equivalent

The epoxy equivalent was measured according to a method described in JIS K-7236.

(5) Melt Viscosity

The melt viscosity was determined at 150° C. by the cone-plate method.

Measurement apparatus: Cone-plate (ICI) high temperature viscometer (manufactured by Research Equipment (London) Ltd)

Measurement range of cone: 0 to 0.50 Pa·s

Sample quantity: 0.05±0.005 g (6) p-Orientation Ratio

The p-orientation ratio was determined by $^{13}$C-NMR measurement.

Measurement apparatus: Gemini 300 (manufactured by Varian, Inc.)

Example 1

In a four necked flask equipped with a stirrer, a thermometer and a condenser, 955 parts of phenol and 172 parts of a 47% hydrobromic acid were placed; the mixture thus obtained was added with 125 parts of 4,4'-bis(chloromethyl)-1,1'-biphenyl at 30° C. under stirring; and the reaction mixture thus obtained was allowed to react at 30° C. for 6 hours, and at 80° C. for 2 hours. After completion of the reaction, the reaction mixture was neutralized with a 25% aqueous solution of sodium hydroxide, thereafter added with 2000 parts of methyl isobutyl ketone and was repeatedly washed with water. Then, the unreacted phenol and the methyl isobutyl ketone were distilled off from the oil layer under heating and reduced pressure to yield 173 parts of a phenolic resin (P1) of the present invention. The obtained phenolic resin (P1) was found to have a softening point of 174° C., a hydroxyl equivalent of 188 g/eq, a content of the bifunctional components of 85% as a result of the GPC analysis and a p-orientation ratio of the bifunctional components of 0.64 as a result of the HPLC analysis.

Example 2

The same operations as in Example 1 were performed except that the amount of phenol in Example 1 was changed to 714 parts to yield 174 parts of a phenolic resin (P2) of the present invention. The obtained phenolic resin (P2) was found to have a softening point of 173° C., a hydroxyl equivalent of 189 g/eq, a content of the bifunctional components of 81% and a p-orientation ratio of the bifunctional components of 0.65.

Example 3

The same operations as in Example 1 were performed except that the amount of phenol in Example 1 was changed to 476 parts to yield 167 parts of a phenolic resin (P3) of the present invention. The obtained phenolic resin (P3) was found to have a softening point of 172° C., a hydroxyl equivalent of 190 g/eq, a content of the bifunctional components of 76% and a p-orientation ratio of the bifunctional components of 0.66.

Example 4

The same operations as in Example 1 were performed except that the amount of phenol in Example 1 was changed to 238 parts to yield 163 parts of a phenolic resin (P4) of the present invention. The obtained phenolic resin (P4) was found to have a softening point of 170° C., a hydroxyl equivalent of 196 g/eq, a content of the bifunctional components of 63% and a p-orientation ratio of the bifunctional components of 0.69.

Comparative Example 1

In a four necked flask equipped with a stirrer, a thermometer and a condenser, 1428 parts of phenol and 1 part of p-toluenesulfonic acid were placed; the mixture thus obtained was added with 125 parts of 4,4'-bis(chloromethyl)-1,1'-biphenyl at 70° C. under stirring over a period of 2 hours; and the mixture thus obtained was allowed to react at 70° C. for 2 hours. After completion of the reaction, the reaction mixture was added with 2000 parts of methyl isobutyl ketone and was repeatedly washed with water until the washing water became neutral. Then, the unreacted phenol and the methyl isobutyl ketone were distilled off from the oil layer under heating and reduced pressure to yield 175 parts of a phenolic resin (P5) for comparison. The obtained phenolic resin (P5) was found to have a softening point of 150° C., a hydroxyl equivalent of 186 g/eq, a content of the bifunctional components of 89% and a p-orientation ratio of the bifunctional components of 0.52.

Comparative Example 2

The same operations as in Comparative Example 1 were performed except that the amount of phenol in Comparative Example 1 was changed to 238 parts to yield 162 parts of a phenolic resin (P6) for comparison. The obtained phenolic resin (P6) was found to have a softening point of 62° C., a hydroxyl equivalent of 199 g/eq, a content of the bifunctional components of 54% and a p-orientation ratio of the bifunctional components of 0.47.

Example 5

In a four necked flask equipped with a stirrer, a thermometer and a condenser, 376 parts of the phenolic resin (P1) obtained in Example 1, 1110 parts of epichlorohydrin and 222 parts of dimethyl sulfoxide were placed to prepare a solution, the solution was heated to 50° C. and then added with 82 parts of flaky sodium hydroxide (purity 99%) over a period of 90 minutes, and thereafter the solution was further allowed to react at 50° C. for 2 hours and at 75° C. for 1 hour. Then the reaction mixture thus obtained was repeatedly washed with water until the washing water became neutral, then the excessive epichlorohydrin was distilled off from the oil layer under heating and reduced pressure, and the residue was added with 976 parts of methyl isobutyl ketone to be dissolved. Further, the methyl isobutyl ketone solution thus obtained was heated to 75° C., added with 20 parts of a 30% by weight aqueous solution of sodium hydroxide, allowed to react for 1 hour, and then the reaction mixture thus obtained was repeatedly washed with water until the washing water became neutral. Then, the methyl isobutyl ketone was distilled off at 180° C. from the oil layer under heating and reduced pressure to yield 464 parts of an epoxy resin (E1) of the present invention. The obtained epoxy resin (E1) exhibited crystallinity, and was found to have an epoxy equivalent of 251 g/eq, a softening point of 98° C., a melt viscosity of 0.05 Pa·s, a content of the bifunctional components of 79% as a result of a GPC analysis of the obtained epoxy resin and a p-orientation ratio of 0.64 as a result of a $^{13}$C-NMR analysis of the obtained epoxy resin.

Example 6

The same operations as in Example 5 were performed except that the phenolic resin (P1) in Example 5 was replaced with 376 parts of the phenolic resin (P2) to yield 463 parts of an epoxy resin (E2) of the present invention. The obtained epoxy resin (E2) exhibited crystallinity, and was found to have an epoxy equivalent of 257 g/eq, a softening point of 99° C., a melt viscosity of 0.03 Pa·s, a content of the bifunctional components of 72% and a p-orientation ratio of 0.64.

Example 7

The same operations as in Example 5 were performed except that the phenolic resin (P1) in Example 5 was replaced with 378 parts of the phenolic resin (P3) to yield 465 parts of an epoxy resin (E3) of the present invention. The obtained epoxy resin (E3) exhibited crystallinity, and was found to have an epoxy equivalent of 260 g/eq, a softening point of 96° C., a melt viscosity of 0.03 Pa·s, a content of the bifunctional components of 68% and a p-orientation ratio of 0.66.

Example 8

The same operations as in Example 5 were performed except that the phenolic resin (P1) in Example 5 was replaced with 390 parts of the phenolic resin (P4) to yield 477 parts of an epoxy resin (E4) of the present invention. The obtained epoxy resin (E4) exhibited crystallinity, and was found to have an epoxy equivalent of 262 g/eq, a softening point of 94° C., a melt viscosity of 0.05 Pa·s, a content of the bifunctional components of 56% and a p-orientation ratio of 0.63.

Comparative Example 3

The same operations as in Example 5 were performed except that the phenolic resin (P1) in Example 5 was replaced with 372 parts of the phenolic resin (P5) and the amount of epichlorohydrin was changed to 2776 parts to yield 460 parts of an epoxy resin (E5). The obtained epoxy resin (E5) exhibited no crystallinity and was semisolid after melt cooling, and was found to have an epoxy equivalent of 249 g/eq, a melt viscosity of 0.03 Pa·s, a content of the bifunctional components of 84% and a p-orientation ratio of 0.53.

Comparative Example 4

The same operations as in Example 5 were performed except that the phenolic resin (P1) in Example 5 was replaced with 398 parts of the phenolic resin (P6) to yield 469 parts of an epoxy resin (E6). The obtained epoxy resin (E6) exhibited no crystallinity and was semisolid after melt cooling, and was found to have an epoxy equivalent of 269 g/eq, a melt viscosity of 0.07 Pa·s, a content of the bifunctional components of 49% and a p-orientation ratio of 0.47.

Examples 9 and 10, and Comparative Examples 5 and 6

The epoxy resin (E2) obtained in Example 6, biphenyl novolac epoxy resin (R) (NC-3000, manufactured by Nippon Kayaku Co., Ltd.) as an epoxy resin for comparison, a phenol aralkyl phenolic resin (hydroxyl equivalent: 199 g/eq, softening point: 65° C.) represented by the following general formula (8) as a curing agent,

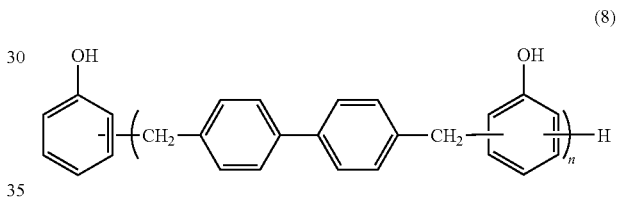

(8)

triphenylphosphine (manufactured by Junsei Kagaku Co., Ltd.) as a curing accelerator and a spherical silica (MSR-2212, manufactured by Tatsumori Co., Ltd.) as an inorganic filler were used, and mixed according to the weight ratios specified in the section of "Composition of formulation" in Table 1, kneaded with a roll, and thereafter the spiral flow was measured under the conditions of 175° C. and a molding pressure of 70 kg/cm² (Example 9 and Comparative Example 5). Alternatively, the compositions prepared by mixing according to the weight ratios specified in the section of "Composition of formulation" in Table 1 without adding any inorganic filler were subjected to transfer molding for 180 seconds, and thereafter cured at 160° C. for 2 hours and further at 180° C. for 6 hours to prepare specimens; the specimens were subjected to the tests for the glass transition temperature (TMA) and the water absorption percentage under the following conditions, and the results thus obtained are shown in the section of "Physical properties of cured product" in Table 1 (Example 10 and Comparative Example 6).

(1) Glass Transition Temperature (° C.)

Thermomechanical analysis apparatus (TMA): TM-7000, manufactured by Sinku-Riko Co., Ltd.

Temperature increase rate: 2° C./min (2) Water Absorption Percentage

Specimen: Disc of 5 cm in diameter×4 mm in thickness

Weight increment after boiling for 24 hours in hot water at 100° C. (% by weight)

TABLE 1

|  | Example 9 | Example 10 | Comparative Example 5 | Comparative Example 6 |
|---|---|---|---|---|
| Composition of formation (parts by weight) | | | | |
| Epoxy resin (E2) | 610 | 100 | 0 | 0 |
| Epoxy resin (R) | 0 | 0 | 632 | 100 |
| Phenolic resin | 472 | 77 | 453 | 72 |
| Triphenylphosphine | 18 | 1 | 15 | 1 |
| Spherical silica | 8900 | 0 | 8900 | 0 |
| Physical properties of composition | | | | |
| Spiral flow (cm) | 61 | — | 49 | — |
| Physical properties of cured product | | | | |
| Glass transition point (° C.) | — | 124 | — | 130 |
| Water absorption percentage (% by weight) | — | 0.8 | — | 0.9 |

As described above, the epoxy resin composition using the epoxy resin of the present invention exhibited an extremely low viscosity (as concluded from a long spiral flow in spite of a relatively high filler content of 89%), and additionally the cured product of the epoxy resin composition using the epoxy resin of the present invention exhibited an excellent heat resistance, an excellent water resistance and an excellent impact resistance.

INDUSTRIAL APPLICABILITY

The epoxy resin composition of the present invention can be used in a wide range of applications associated with materials such as electric and electronic materials, molding materials, casting materials, laminate materials, coating compositions, adhesives, resists and optical materials.

The invention claimed is:

1. A phenolic resin which is a phenol aralkyl phenolic resin represented by formula (1),
    wherein a total content of compounds respectively represented by formulas (2) to (4) as measured by GPC is 58 to 92%, and
    a component ratio between the compounds respectively represented by formulas (2) to (4) as measured by HPLC is represented by a following relation:

$0.60 \leq (2a+b)/(2a+2b+2c) \leq 0.90$ wherein
    a; a content proportion of the compound of formula (2)
    b; a content proportion of the compound of formula (3)
    c; a content proportion of the compound of formula (4)

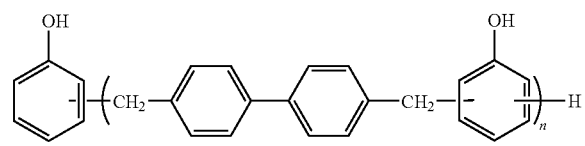
(1)

In formula (1), n denotes a repetition number and represents a positive number of 1 to 10

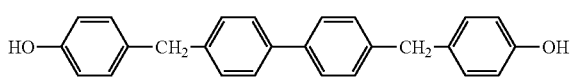
(2)

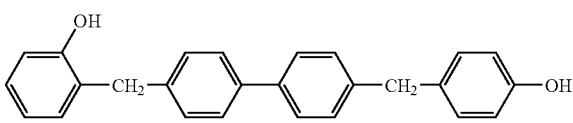
(3)

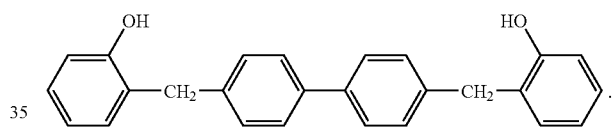
(4)

2. A process for producing the phenolic resin according to claim 1, wherein a biphenyl compound represented by formula (5) and phenol are subjected to a reaction in the presence of a strongly acidic substance

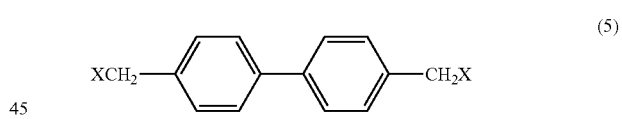
(5)

In formula (5), X represents a chlorine atom, a bromine atom, a methoxy group, an ethoxy group or a hydroxy group.

3. The process for producing the phenolic resin according to claim 2, wherein the strongly acidic substance is hydrogen bromide.

4. A crystalline epoxy resin which is obtained by subjecting the phenolic resin according to claim 1 and epihalohydrin to a reaction in the presence of an alkali metal hydroxide.

5. An epoxy resin which is a phenol aralkyl epoxy resin represented by formula (6), wherein a total number of moles "p-coordination number" of benzene rings in each of which a methylene group is bonded at a p-position in relation to a glycidyl ether group and a total number of moles "o-coordination number" of benzene rings in each of which a methylene group is bonded at an o-position in relation to a glycidyl ether group satisfy the relation, 0.57≦p-coordination number/(p-coordination number+o-coordination number)≦0.90, and a total content of compounds represented by formula (7) as measured by GPC is 53 to 92%

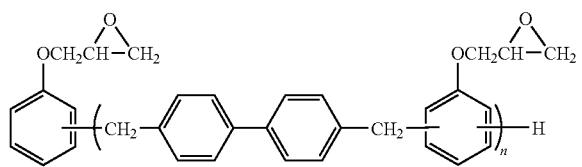
(6)

In formula (6), n denotes a repetition number and represents a positive number of 1 to 10

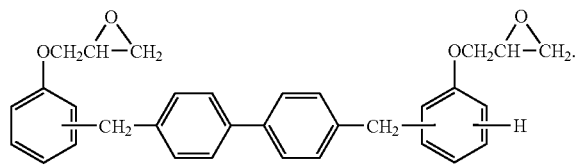
(7)

6. An epoxy resin composition, comprising the epoxy resin according to claim 4 or 5 and a curing agent.

7. The epoxy resin composition according to claim 6, comprising a curing accelerator.

8. The epoxy resin composition according to claim 6, comprising an inorganic filler.

9. A cured product obtainable by curing the epoxy resin composition according to claim 6.

10. The epoxy resin composition according to claim 7, comprising an inorganic filler.

11. A cured product obtainable by curing the epoxy resin composition according to claim 7.

12. A cured product obtainable by curing the epoxy resin composition according to claim 8.

13. A cured product obtainable by curing the epoxy resin composition according to claim 10.

* * * * *